(12) United States Patent
Clark

(10) Patent No.: US 6,837,447 B1
(45) Date of Patent: Jan. 4, 2005

(54) APPARATUS FOR ADAPTING AIR BLOWER TO PERFORM LIQUID DISPERSAL AND RELATED METHOD

(76) Inventor: Lacey Booth Clark, 440 Main St., Webb, MS (US) 38966

( * ) Notice: Subject to any disclaimer, the term of this patent is extended or adjusted under 35 U.S.C. 154(b) by 116 days.

(21) Appl. No.: 10/449,049

(22) Filed: May 30, 2003

(51) Int. Cl.$^7$ ................................................. B05B 7/30
(52) U.S. Cl. ...................... 239/318; 239/152; 239/154; 239/289; 239/142; 239/143; 239/307; 239/308; 239/346; 239/365; 239/366
(58) Field of Search .............................. 239/142, 143, 239/152, 153, 154, 289, 304, 307, 308, 318, 346, 347, 365, 366

(56) References Cited

U.S. PATENT DOCUMENTS

| | | | |
|---|---|---|---|
| 1,769,428 A | * | 7/1930 | Gatchet ...................... 239/318 |
| 1,822,743 A | * | 9/1931 | Mitchell ..................... 239/366 |
| 2,610,433 A | * | 9/1952 | Chisholm et al. ........... 239/365 |
| 4,030,244 A | | 6/1977 | Tennes et al. |
| 4,896,833 A | | 1/1990 | Brody |
| 5,064,123 A | | 11/1991 | Aiello et al. |
| 5,186,395 A | | 2/1993 | Brody |
| 5,226,567 A | * | 7/1993 | Sansalone .................. 222/195 |
| 5,392,996 A | | 2/1995 | Ussery |
| 5,429,278 A | * | 7/1995 | Sansalone .................. 222/195 |
| 5,547,128 A | | 8/1996 | Scheffler |
| 5,779,161 A | | 7/1998 | Dvorak |
| 5,947,384 A | | 9/1999 | McCauley |
| 6,003,787 A | | 12/1999 | Fisher |
| 6,039,060 A | | 3/2000 | Rower |
| 6,056,167 A | | 5/2000 | Dorow et al. |
| 6,092,260 A | | 7/2000 | Kai |
| 6,109,548 A | | 8/2000 | George et al. |
| 6,328,233 B1 | | 12/2001 | Moy et al. |
| 6,409,097 B1 | | 6/2002 | McCauley |
| 6,446,578 B1 | | 9/2002 | Irwin |
| 2002/0139875 A1 | | 10/2002 | Barnett |

OTHER PUBLICATIONS

Masanao, Yoshizawa, "*Disinfecting Sprayer.*" Patent Abstracts of Japan, Application #09–160513, filing date: Dec. 15, 1998, http://www1.ipdl.jpo.go.jp/PA1/result/detail/main/wAAAa02400DA410328277P7.htm.

Yashuhiko, Miyake; Hiroyuki, Nakajima, "*Method and Equipment for Spraying Liquid Chemical.*" Patent Abstracts of Japan, Application #02–312945, filing date: Nov. 20, 1990, http://www1.ipdl.jpo.go.jp/PA1/result/detail/main/wAAAa20609DA404187256P9.htm.

* cited by examiner

*Primary Examiner*—Robin O. Evans
(74) *Attorney, Agent, or Firm*—Lanier Ford Shaver & Payne P.C.; George P. Kobler, Esq.

(57) ABSTRACT

An apparatus for adapting a blower system to the dispersing of liquid material is partially housed within an extension tube of a portable blower and includes a pressurizing tub with an inlet for accepting airflow discharged by the blower. The pressurizing tube discharges into a liquid container thus increasing pressure within the container. An extraction tube exits the container and meets a Venturi tube that also accepts airflow discharge by the blower. A vacuum is created in the extraction tube through first and second apertures that allow fluid communication between the Venturi tube and the extraction tube. The vacuum created in the extraction tube extracts liquid from the liquid container and the liquid is drawn out of the extraction tube through the Venturi hole into the Venturi tube mixing with air flowing there through and discharging into airflow by-passing the spray adapter apparatus.

15 Claims, 3 Drawing Sheets

APPARATUS FOR ADAPTING AIR BLOWER TO PERFORM LIQUID DISPERSAL AND RELATED METHOD

BACKGROUND

1. Field

The present invention relates generally to apparatus for dispersal of liquid material, and more particularly to an apparatus to adapt an air blower to perform such dispersal of liquid material.

2. Description of the Related Art

Many devices have been conceived to adapt common air blowers such as those used to blow leaves and grass clippings to apply certain dry or liquid treatments such as herbicides, fungicides, pesticides and fertilizers to lawn and garden flora. These include U.S. Pat. No. 6,409,097 which discloses an attachment for a portable blower which uses gravity feed via a feed tube to effect injection of the liquid to be dispersed into the air stream. U.S. Pat. No. 5,947,384 discloses an attachment for injecting dry compounds into the air stream generated by a leaf blower, again using a gravity feed technique. U.S. Pat. No. 4,474,327 describes a system for permitting a leaf blower to distribute dry material whereby a hopper containing the dry material accepts a suction tube which communicates a low pressure effect to the hopper. The low pressure effect is generated by a Venturi throat formed in a discharge tube of the leaf blower.

The above devices, while likely effective for application of a given material, have certain disadvantages. For example, external feed tubes may encumber use of the leaf blower. Gravity fed systems typically do not exhibit the performance exhibited by pressurized systems. In addition, they have the requirement that material containers must be held at a height sufficient to generate sufficient exit velocity into the air stream.

An apparatus is needed which provides simple, reliable, inexpensive means of adapting a leaf blower to be used in application of liquid treatments. Such an apparatus could be an accessory to existing blower systems or incorporated into a blower. Such a device would also allow unhindered use of the blower system.

SUMMARY

The present disclosure is directed to an adapter apparatus that satisfies this need. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

An adapter apparatus for converting a portable air blower to dispersing of liquid material in accordance with the present invention comprises a pressurizing tube and a Venturi tube, housed within an airflow directing tube fitted to the discharge of a portable blower. Pressurizing tube receives airflow generated by the portable blower and extends into a liquid container mounted outside the airflow directing tube. Venturi tube also receives airflow generated by the portable blower and extends parallel to the longitudinal axis of the airflow directing tube. An extraction tube extends from the liquid container, proximally to the pressurizing tube, until it bends to abut the Venturi tube, and includes a first aperture in the wall of the extraction tube. The first aperture is aligned with a second aperture in the wall of the Venturi tube such that fluid communication between the Venturi tube and the extraction tube is permitted.

Airflow received by pressurizing tube is conveyed to the liquid container thereby putting the contents thereof under pressure. Airflow received by Venturi tube creates a low-pressure effect at the end of the tube where, through first and second apertures, a vacuum is created in extraction tube, drawing liquid from liquid container. The liquid is entrained through first and second apertures and mixed with the airflow in the tube and discharged, further mixing with by-passed airflow in the airflow directing tube and discharged from the discharge end of the tube.

The liquid container is suspended from the airflow directing tube by means of a container cap affixed to the airflow directing tube wall. The container cap acts as a sealed flange through which the pressurizing tube and the extraction tube are accepted into the liquid container. The container cap and the liquid container may be configured to allow threaded mating of the liquid container to the container cap.

An alternative embodiment includes an airflow directing tube formed with a recess for receiving and suspending the liquid container. The recess would also act as a sealed flange through which the pressurizing tube and the extraction tube are accepted into the liquid container. The recess and the liquid container may be configured to allow threaded mating of the liquid container to the recess.

An alternative embodiment further comprises a spray tip on the discharge end of the Venturi tube for adjusting the flow rate of the liquid-air mixture. A further embodiment has the spray tip allowing adjustment of the flow rate of the liquid-air mixture exiting the tip.

Another embodiment further comprises intake funnels affixed to the intake ends of the pressurizing and Venturi tubes.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

Figure 1:
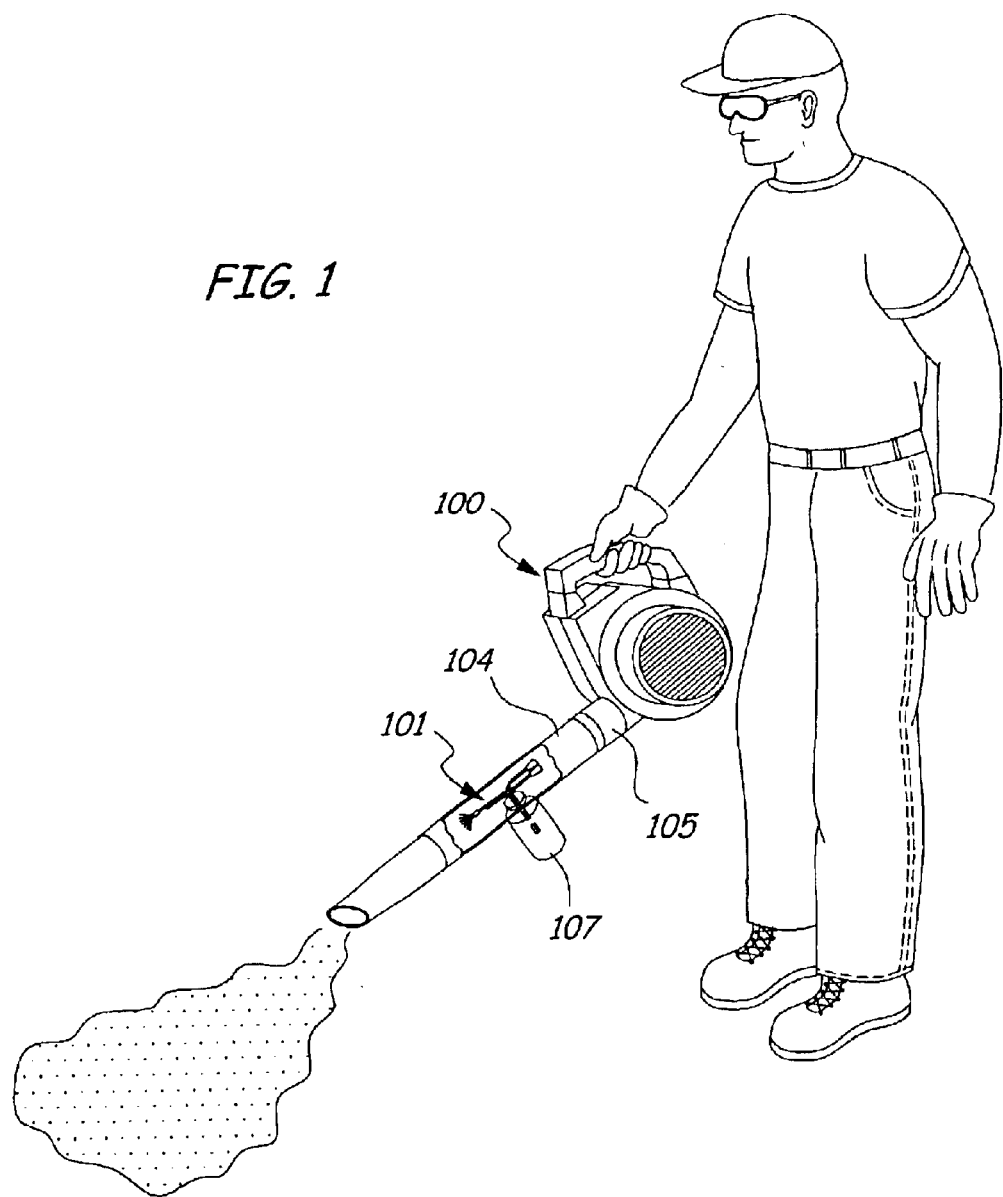
FIG. 1 depicts the use of the spray adapter apparatus

The various embodiments of the present invention and their advantages are best understood by referring to the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

FIG. 1 depicts a portable blower 100 including an airflow directing tube 104 for adapting the blower 100 to dispersing liquids according to the present invention. Blower 100 may be powered by an electric or combustion motor (not shown). Airflow directing tube 104 couples to air discharge outlet 105 and not only guides discharged airflow but also houses spray adapter apparatus 101. Airflow directing tube 104 also provides a structure to which liquid container 107 may be mounted.

Figure 2A:
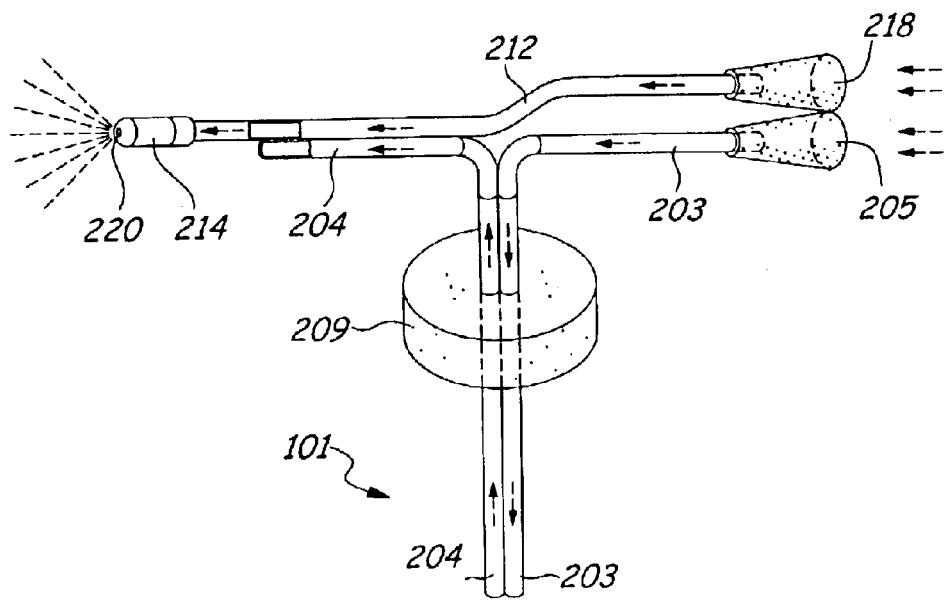
FIG. 2A depicts the spray adapter apparatus
Figure 2B:
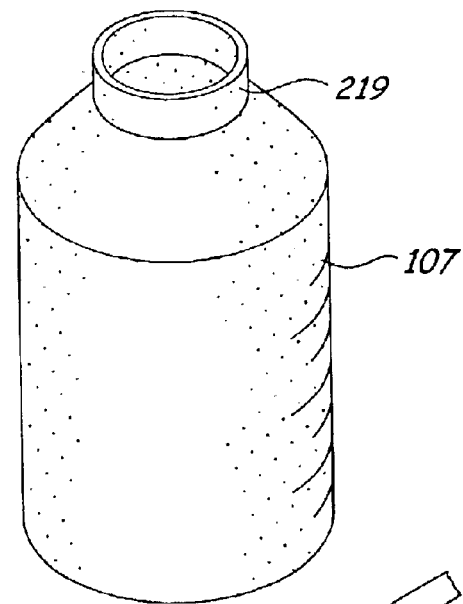
FIG. 2B is an exploded view of a portion of the spray adapter apparatus
Figure 2B:
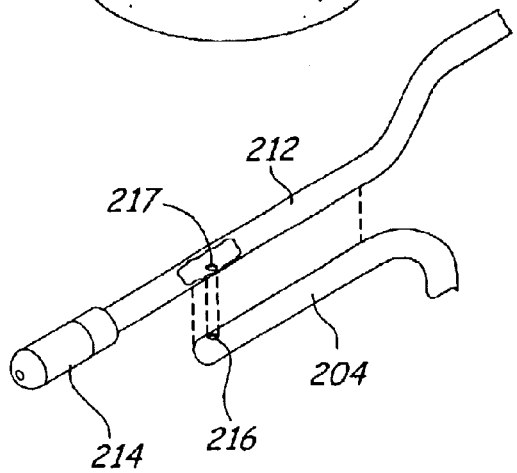
Figure 3:
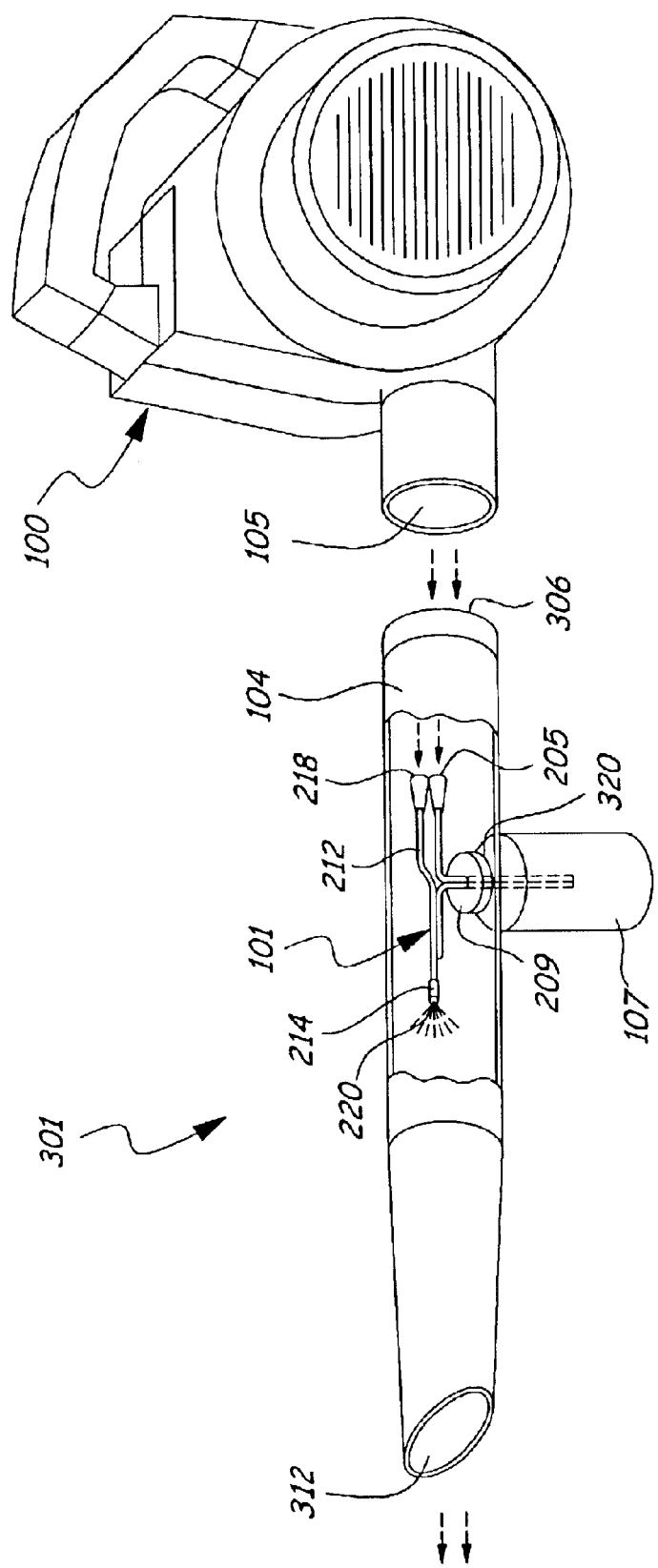
FIG. 3 depicts a portable blower configured with a spray adapter apparatus

Spray adapter apparatus 101 according to the present invention is described in detail with reference to FIG. 2A and is comprised of a pressurizing tube 203 having an air intake 205. Pressurizing tube 203 is formed such that a segment with air intake 205, is substantially parallel to a longitudinal axis of blower air exhaust tube in which spray adapter apparatus 101 is mounted and a segment substantially normal to such longitudinal axis which inserts to liquid container 107 through container cap 209. Liquid container 107 is of a material suitable to store chemical compositions such as fertilizer, herbicides, fungicides and insecticides. Liquid container 107 should preferably be constructed of a light-weight material in order to reduce the downward-tending moment on the overall blower apparatus when fully assembled. Container cap 209 is in communication with container neck 219, preferably in a threaded manner, and preferably fitted with a gasket to prevent liquid and vapor leakage container neck 219 is fitted therein.

Extraction tube 204 is likewise formed such that a segment is parallel to the longitudinal axis of blower air exhaust tube in which spray adapter apparatus 101 is mounted and a segment normal to such longitudinal axis which inserts to liquid container 107 through container cap 209 parallel to pressurizing tube 203 which is a suction end of said extraction tube 204. Thus, container cap 209 acts as a common flange to both pressurizing tube and extraction tube 203, 204. As would be apparent to one skilled in the art, the segment of extraction tube 204 inserted into liquid container 107 should be long enough to be in communication with liquid material in liquid container 107. Furthermore, it should be noted that pressurizing tube intake 205 and Venturi tube inlet 218 preferably comprise funnels affixed thereto respectively to aid in the redirection of airflow into the respective tubes.

The opposing segment of extraction tube 204 is conjoined with Venturi tube 212. Venturi tube 212 comprises an inlet 218 at one end and is fitted with spray tip 214 at an outlet end distal to inlet 218. Spray tip 214 comprises a spray aperture 220 through which liquid may be dispersed. Spray aperture 220 is preferably adjustable to control flow rate of the expelled liquid-air mixture. Venturi tube 212 is disposed roughly parallel with, and affixed to the opposing segments of extraction tube 204 and pressurizing tube 203.

With reference to FIG. 2B, fluid communication between extraction tube 204 and Venturi tube 212 is permitted by a first aperture 216 disposed in the wall of extraction tube 204 and by a second aperture 217 disposed in the wall of Venturi tube 212 and aligned with first aperture 216.

With reference to FIG. 3, a dispersal system 301 is shown where spray adapter apparatus 101 is partially mounted within airflow directing tube 104 wherein pressuring tube intake 205, and Venturi tube inlet 218 are oriented within airflow directing tube 104 to receive airflow blown into intake end 306 of airflow directing tube 104. Venturi tube 212 is disposed within airflow directing tube 104 substantially parallel to the longitudinal axis of said air airflow directing tube 104. Spray tip 216 is oriented such that spray aperture 220 is open to exhaust end 312 of airflow directing tube 104. Liquid container 107 is mounted outside of airflow directing tube 104 and is held in place by virtue of being removably attached to container cap 209, which sits within cap mounting aperture 320 in the wall of airflow directing tube 104.

As an alternative, the functions of container cap 209 could be served by forming airflow directing tube 104 with a recess to receive container neck 219, where the recess could be threaded and having a gasket, for allowing removable attachment of liquid container 107 to airflow directing tube 104. The pressurizing tube and extraction tube would also be inserted into liquid container 107 through the recess from within airflow directing tube 104. Other means of mounting liquid container 107 to airflow directing tube 104 would be apparent to those skilled in the relevant arts.

In operation, airflow discharged from a blower enters airflow directing tube 104 at intake end and is directed into pressurizing tube 203 via intake 205 and is communicated to liquid container 107 thereby increasing pressure within liquid container 107. A second portion of airflow within airflow directing tube 104 is directed into Venturi tube 212 via second inlet 218. Liquid within liquid container 107, having been under increased pressure, is forced into extraction tube 204. Airflow within Venturi tube 212 causes extraction of liquid from extraction tube 204 via first and second apertures 216, 217 (see FIG. 2B) by virtue of the well-known Venturi effect, entraining the liquid into the Venturi tube. The thus-extracted liquid is commingled with airflow within Venturi tube 212 and then conveyed to spray tip 214 where it exits via spray aperture 220 and joins bypass airflow 315 exiting airflow directing tube 104 at exhaust end 312.

It can be appreciated by those skilled in the art with the benefit of reading this disclosure that the present invention is possessed of certain advantages over other liquid dispersal techniques and systems. Among these are delivery of the liquid dispersant is accomplished completely through communication gas or electrically powered airflow generated externally to the apparatus itself. Therefore, there are no moving parts leading to a reduction in the likelihood of mechanical failure of the apparatus. There is no external feed tubing that can hinder or encumber use of the device. Also in contrast to systems which use a gravity feed technique to introduce the liquid into the air stream, the present invention provides pressurized delivery of the liquid into the exhaust air stream. Thus, the liquid is dispersed over a greater distance. Furthermore, the liquid is atomized as it is introduced back into the air stream providing greater dispersal effectiveness.

A device embodying this invention may be produced in a kit for retrofitting existing blower systems. Alternatively, a blower system may be built to incorporate spray adapter and sold as a unit.

As described above and shown in the associated drawings, the present invention comprises an apparatus for air-powered sprayer. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

I claim:

1. An apparatus for adapting a blower to dispersion of liquid material comprising:
   a. a spray adapter apparatus, said spray adapter apparatus comprising:
      i. a pressurizing tube having an intake end and a discharge end;
      ii. an extraction tube having a suction end, and comprising a first aperture in a wall of said extraction tube, said first aperture disposed in a segment of said extraction tube wall distal to said suction end; and
      iii. a Venturi tube having an inlet and an outlet, and comprising a second aperture in a wall of said Venturi tube disposed in a segment proximal to said outlet, said second aperture aligned with said first aperture of said extraction tube such that fluid communication between said extraction tube and said Venturi tube is allowed;
   b. an airflow directing tube enclosing said spray adapter apparatus such that a longitudinal axis defined by said Venturi tube of said spray adapter apparatus is substantially parallel to a longitudinal axis of said airflow directing tube and such that said discharge end of said pressurizing tube and said suction end of said extraction tube extend to the exterior of said airflow directing tube; and
   c. a liquid container for holding said liquid material removably coupled to said spray adapter apparatus mounted externally of said airflow directing tube such that said discharge end of said pressurizing tube and said suction end of said extraction tube are accepted therein.

2. The apparatus according to claim 1, wherein said pressurizing tube further comprises a first funnel affixed to said intake end and said Venturi tube further comprises a second funnel affixed to said inlet.

3. The apparatus according to claim 2, wherein said Venturi tube further comprises a spray tip affixed to said outlet of said Venturi tube.

4. The apparatus according to claim 3, wherein said spray tip further comprises a means for adjusting flow rate liquid and gas discharged from said spray tip.

5. A portable apparatus for dispersing liquid material comprising:
   a. a portable airflow generator having a discharge outlet through which an airflow is expelled;
   b. an airflow directing tube coupled at one end to said discharge outlet for receiving said airflow;
   c. an entrainment apparatus mounted partially within said airflow directing tube and thus disposed therein such that a longitudinal axis of said entrainment apparatus is substantially parallel to a longitudinal axis of said airflow directing tube, comprising:

i. a pressurizing tube having an intake end and a discharge end extending through a wall of said airflow directing tube;

ii. an extraction tube having a suction end extending through said wall of said airflow directing tube, and comprising a first aperture in a wall of said extraction tube, said first aperture disposed in a segment of said extraction tube wall distal to said suction end; and d. a Venturi tube having an inlet and an outlet, and comprising a second aperture in a wall of said Venturi tube disposed in a segment proximal to said outlet, said second aperture aligned with said first aperture of said extraction tube such that fluid communication between said extraction tube and said Venturi tube is allowed; and e. a liquid container for holding said liquid material removably coupled with said entrainment apparatus such that said discharge end of said pressurizing tube and said suction end of said extraction tube are accepted therein.

6. The apparatus according to claim 5, wherein said pressurizing tube further comprises a first funnel affixed to said intake end and said Venturi tube further comprises a second funnel affixed to said inlet.

7. The apparatus according to claim 6, wherein said Venturi tube further comprises a spray tip affixed to said outlet of said Venturi tube.

8. The apparatus according to claim 7, wherein said spray tip further comprises a means for adjusting flow rate liquid and gas discharged from said spray tip.

9. An entrainment apparatus for introducing liquid into an airflow generated by a portable blower, said blower having an airflow directing tube, said apparatus being mounted to said airflow directing tube, comprising:

a. a pressurizing tube having an intake end and a discharge end;

b. an extraction tube having a suction end, and comprising a first aperture in a wall of said extraction tube, said first aperture disposed in a segment of said extraction tube wall distal to said suction end; and c. a Venturi tube having an inlet and an outlet, and comprising a second aperture in a wall of said Venturi tube disposed in a segment proximal to said low pressure end, said second aperture aligned with said first aperture of said extraction tube such that fluid communication between said extraction tube and said Venturi tube is allowed;

wherein said entrainment apparatus is partially enclosed by said airflow directing tube such that a longitudinal axis defined by said Venturi tube of said adapter apparatus is parallel to a longitudinal axis of said airflow directing tube.

10. The apparatus according to claim 9, further comprising a liquid container coupled to said entrainment apparatus such that said discharge end of said pressurizing tube and said suction end of said extraction tube are accepted therein, where said liquid container is disposed externally of said airflow directing tube.

11. The apparatus according to claim 10, wherein said pressurizing tube further comprises a first funnel affixed to said intake end and said Venturi tube further comprises a second funnel affixed to said inlet.

12. The apparatus according to claim 11, wherein said Venturi tube further comprises a spray tip affixed to said outlet of said Venturi tube.

13. The apparatus according to claim 12, wherein said spray tip further comprises a means for adjusting flow rate liquid and gas discharged from said spray tip.

14. A method of dispersing a liquid using a portable blower comprising the steps of:

a. guiding a first portion of an airflow generated by said portable blower to pressurize a container holding said liquid;

b. guiding a second portion of said airflow into a Venturi tube;

c. entraining said liquid from said container into second portion of said airflow within said Venturi tube wherein a liquid and air mixture is obtained; and d. releasing said liquid and air mixture into a bypass airflow.

15. The method of claim 14 wherein said step of releasing said liquid and air mixture further comprises adjusting a flow rate of said liquid and air mixture.

* * * * *